Figures 1, 2:
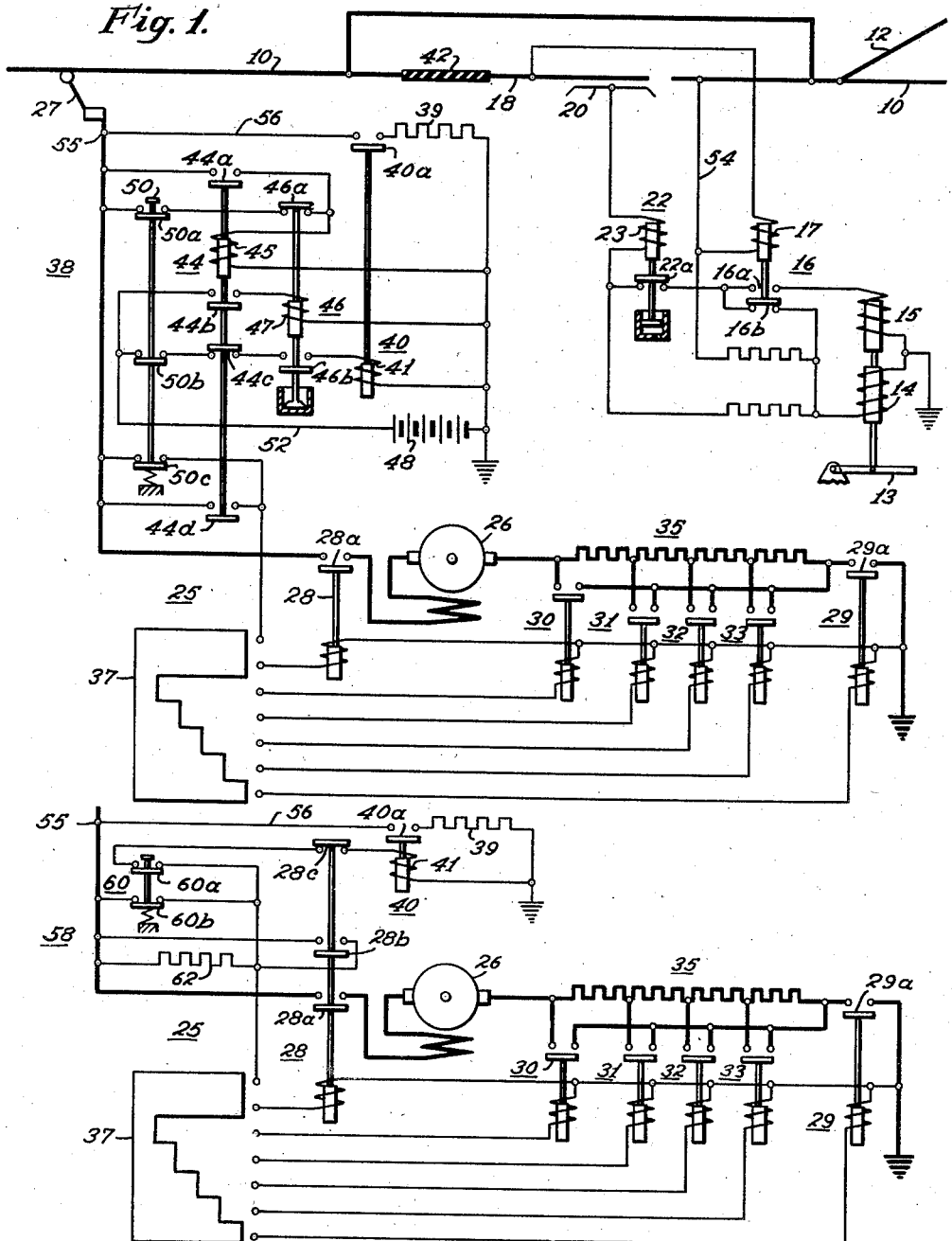

Dec. 16, 1947.  R. P. HANNA ET AL  2,432,882
MANUAL CONTROL SYSTEM FOR SWITCHES FOR TROLLEY VEHICLES
Filed Sept. 27, 1944

WITNESSES:
Edward Michaels
Nw. C. Groome

INVENTORS
Raymond P. Hanna &
Norman J. Rosen.
BY
G. M. Crawford
ATTORNEY

Patented Dec. 16, 1947

2,432,882

UNITED STATES PATENT OFFICE 2,432,882

MANUAL CONTROL SYSTEM FOR SWITCHES FOR TROLLEY VEHICLES

Raymond P. Hanna and Norman J. Rosen, Pittsburgh, Pa., assignors to Westinghouse Electric Corporation, East Pittsburgh, Pa., a corporation of Pennsylvania Application September 27, 1944, Serial No. 555,987

8 Claims. (Cl. 246—231)

1

Our invention relates, generally, to control systems and has reference, in particular, to switch control systems for track and trolley conductor switches in trolley and trolley bus systems.

Generally stated, it is an object of our invention to provide a control system for a switch in a track or trolley system, which is simple and inexpensive to manufacture and is easy to operate.

More specifically, it is an object of our invention to provide for selectively operating a track or trolley switch in accordance with predetermined control circuits on a vehicle approaching said switch, regardless of the operating condition of the power circuit of the vehicle.

It is also an object of our invention to provide for selectively preparing a predetermined control circuit on a vehicle for operating a track or trolley conductor switch, and for preventing inadvertent operation of the switch due to current drawn by the vehicle power and control circuits.

Another object of our invention is to provide for momentarily deenergizing the power circuit of an electrically operated vehicle as it approaches a switch at an intersection in the track or trolley conductor, so that the operator may selectively control the operation of a switch control relay for determining in which direction the vehicle or the vehicle current collector will proceed.

Other objects will, in part, be obvious and will, in part, be explained hereafter.

In practicing our invention a control circuit is selectively provided on an electrically operated vehicle for providing a control current of predetermined value for operating a track switch or trolley frog through the medium of a series control relay in the trolley circuit. A section insulator is provided in the trolley circuit in advance of the switch or frog for momentarily deenergizing the vehicle power circuit, so as to permit the operating position of a manual control switch to determine positively whether or not the power circuit will be reenergized, and whether the control circuit is to be connected to the trolley conductor for insuring operation of the series control relay.

For a more complete understanding of the nature and scope of our invention, reference may be made to the accompanying drawing, in which:

Figure 1 is a diagrammatic view of a trolley system embodying the invention in one of its forms, and Fig. 2 is a diagrammatic view of a trolley system illustrating an application of the invention in another of its forms.

Referring to Fig. 1, the reference numeral 10 may denote a main trolley conductor in a street car or trolley bus system which has a branch

2 or turn conductor 12 associated therewith. It will be understood that in a trolley bus system a pair of main and branch conductors will be used, but for the purposes of simplicity, only one main and one branch conductor are shown since they are sufficient for the purpose.

In order to provide for operating a switch point 13 which may be positioned either at the intersection of the main and branch conductors for guiding a current collector along one or the other of the conductors, or adjacent thereto and associated with a track as shown, for guiding the vehicle itself, solenoid windings 14 and 15 may be provided for operating the switch in the direction of the main or branch conductors respectively.

Energization of the switch solenoid windings 14 and 15 may be effected in any suitable manner, such as by means of the well known "series relay circuit" wherein a series switch control relay 16, having an operating winding 17 connected in series circuit relation between an isolated section 18 of the main trolley conductor and the main portion thereof, is utilized for selectively connecting one or the other of the operating windings 14 and 15 to the trolley conductor by means of a contact device 20 positioned adjacent the conductor and disposed to be engaged by and connected to the section 18 by the vehicle current collector for effecting connection thereof to the isolated section 18. A time delay relay 22 having an operating winding 23 may be provided for limiting the duration of energization of the windings 14 and 15, so as to protect them against overheating.

The reference numeral 25 may denote, generally, the power circuit of an electrically operated vehicle having a motor 26 disposed to be energized from the conductor 10 through a current collector 27. Line switches 28 and 29 may be provided for connecting the motor 26 to the current collector 27 through contact members 28a and 29a, respectively. A plurality of control switches 30 through 33 may be provided for controlling the amount of a control resistor 35 in the motor circuit through the medium of a controller 37, which may be of the well known drum type.

In order to provide for selectively controlling the operation of the series switch control relay 16 independently of the operating condition of the power system, a control system 38 may be provided on the vehicle, comprising, for example, a switch control resistor 39 in conjunction with a resistor control switch 40 for controlling the connection of the resistor to the current collector 27. A section insulator 42 may be connected in the trolley conductor circuit a predetermined distance in advance of the contact device 20 to provide for momentarily deenergizing the vehicle power system by deenergizing the line switches 28 and 29 before the current collector engages the contact device 20.

Operation of the resistor control switch 40 may be effected by providing a relatively high voltage relay 44, having an operating winding disposed to be energized from the current collector 27, and a relatively low voltage relay 46, having an operating winding 47 disposed to be energized from a relatively low voltage control source on the vehicle, such as the battery 48. The low voltage relay 46 may be of the delay drop-out type so as to provide a time interval during which the low voltage relay remains in the closed position and the high voltage relay returns to the deenergized position for setting up an energizing circuit for the resistor control switch 40.

Control of the operation of the resistor control switch 40 may be effected by means of a push button switch 50 for interrupting the energizing circuit of both the high voltage relay 44 and the resistor control switch 40 wherever it is desired that the vehicle should turn onto the branch conductor 12 instead of proceeding directly along the main conductor 10. In order to insure that the power system will not be energized during the switching operation due to the controller 37 being left in an operating position, auxiliary contact members may be provided on the push button switch 50 for interrupting the energizing circuit of the line switches 28 and 29.

Auxiliary contact members may also be provided on the high voltage relay 44 for maintaining the line switches 28 and 29 in the energized position until the current collector engages the section insulator 42 so that premature operation of the push button switch 50, some distance in advance of the section insulator 42, will not result in the premature deenergization of the vehicle power system before reaching the section insulator.

If it is desired that the vehicle should proceed directly along the main conductor 10, the push button switch 50 need not be operated. When the current collector 27 engages the section insulator 42, the high voltage relay 44 and the low voltage relay 46 are momentarily deenergized. The high voltage relay 44 returns to the deenergized position, while the low voltage relay 46 remains in the energized position for a predetermined time interval. An energizing circuit for the operating winding 41 of the resistor control switch 40 is thereby provided extending from the positive terminal of the battery 48 through conductor 52, contact members 50b of the push button switch 50, contact members 44c of the high voltage relay 44, contact members 46b of the low voltage relay 46, operating winding 41 back to the negative terminal of the battery. The resistor control switch 40 operates, connecting the control resistor between the current collector and ground.

When the current collector 27 engages the isolated section 18 a predetermined control current flows from the trolley conductor 10 through conductor 54, operating winding 17 of the series switch control relay to section 18 of the trolley conductor through the current collector 27, terminal point 55, conductor 56, contact members 40a of the resistor control switch 40 and control resistor 39 to ground. The series switch control relay 16 operates, closing its contact members 16a so that the operating winding 15 of the switch is energized from the contact device 29 through the operating winding 23 of the delay relay 22 and contact members 22a thereof, whenever the current collector 27 engages the contact device 20. The switch is accordingly operated to direct the vehicle, or the vehicle current collector, along the conductor 10 in the straight direction.

Should the operator desire to make a turn and proceed along the branch conductor 12, the push button switch 50 may be operated at any time prior to engagement of the current collector 27 with the section insulator 42 and maintain it in the operated position. Until the current collector 27 engages the section insulator 42, nothing happens, since the operating winding 45 of the high voltage relay 44 is provided with a holding circuit through contact members 44a which maintains it in the operated position. The line switches 28 and 29 are therefore maintained energized through contact members 44d. As soon as the current collector engages the section insulator 42, the power system of the vehicle is deenergized and the high voltage relay 44 returns to the deenergized position. The low voltage relay 46 is deenergized as soon as the high voltage relay 46 opens its contact members 44b. Energization of the operating winding 41 of the control switch 40 from the battery 48 is, however, prevented by reason of contact members 50b of the push button switch 50 being open, so that the control resistor 39 remains disconnected from the current collector 27. Opening of contact members 44d of the high voltage relay interrupts the energizing circuit of the line switches 28 and 29, effectively disconnecting the power circuit 25 from the current collector 27.

Since the energizing circuit for the operating winding 45 of the high voltage relay 44 is interrupted by contact members 50a of the push button switch 50 and contact members 50c of the push button switch in the energizing circuit for the line switches 28 and 29 are also open, the line switches remain deenergized when the current collector 27 engages the isolated section 18 of the trolley conductor. Accordingly, little or no current is drawn by the vehicle so that the series switch control relay 16 is not energized, and contact members 16b thereof, remain closed. The operating winding 14 of the switch is therefore connected to the trolley conductor through contact device 20 whenever the current collector 27 engages it. The switch is therefore operated to the turn position in the direction of the branch conductor 12, so that the current collector, or vehicle, is directed in the direction of the branch conductor. Should the vehicle approach the intersection with power off, nothing happens when the push button switch 50 is operated, but after the collector 27 engages the insulator 42 the operator is prevented from applying power accidentally.

Referring to Fig. 2, the reference numeral 58 may denote generally an alternative form of vehicle control system which may be substituted for the control system 38 of Fig. 1 for use in conjunction with the resistor control switch 40 and power system 25, being for example, connected to the current collector 27 at the terminal 55. The numeral 60 may denote a manual control switch of the push button type which may be disposed to provide for controlling the energization of the operating winding 41 of the resistor control switch 40 under predetermined operating conditions to provide for effecting the connection of the control resistor 39 to the current collector 27 in order to effect operation of the series switch control relay 16 in a manner similar to that described hereinbefore in connection with the system shown in Fig. 1.

In order to limit the current drawn by the vehicle and prevent inadvertent operation of the line switches 28 and 29 when the current collector 27 engages the isolated section 18, means such as the current limiting resistor 62 may be provided. The resistor 62 may be arranged for connection in series circuit relation with the operating windings of the line switches 28 and 29 so as to reduce the voltage applied to the windings below the required operating value and prevent undesirable arcing at the control switch contacts. If predetermined positioning of the vehicle controller is not undesirable, the resistor 39 and control switch 40 may be dispensed with. In this event the controller must be held in an operating position when it is desired to operate the control switch 16.

In order to normally render the control resistor 62 ineffective, auxiliary contact means 28b may be provided on the line switch 28 for shunting the control resistor when the line switch is in the operating position. Operation of the control resistor switch 40 may be normally prevented by providing auxiliary contact members 28c on the line switch 28 which may be open whenever the line switch is in the normally closed operating position during operation of the vehicle. Since the current drawn by the vehicle power system 25 even on the first point of the controller 37 is more than sufficient, it may be used to operate the switch control relay 16.

With the push button control switch 60 in the position shown, the control resistor 62 is rendered ineffective by reason of contact members 60b. Whenever the current collector 27 passes over the section insulator 42 with the controller 37 in the "on" position, the vehicle power circuit is deenergized, and the line switches 28 and 29 drop out and are immediately returned to the energized position as soon as the current collector engages section 18 of the trolley conductor by reason of the shunt energizing circuit around the resistor 62 through contact members 60b. Accordingly, the resistor control switch 40 will remain in the deenergized position due to contact members 28c of the line switch 28 being open, and the vehicle power circuit provides the path for the current to operate the series switch control relay 16 for energizing the operating winding 15 to actuate the switch to the turn or branch conductor direction.

Should the vehicle current collector 27 engage the isolated section when the controller 37 is in the "off" position and the push button switch 60 is as shown, the line switches 28 and 29 will not reclose. Accordingly, the resistor control switch 40 is energized through contact members 28c. The control resistor 39 is thereby connected to draw current for operating the switch control relay 16.

If the push button switch 60 is opened as the vehicle approaches the section insulator 42, the energizing circuit for the control resistor relay 40 is opened. Contact members 60a of the manual control switch are opened, but auxiliary contact members 28b of the line switch 28 retain a shunt circuit about the control resistor 62 until the line switch 28 is dropped when the current collector 27 passes on to the section insulator 42. When the current collector 27 leaves the section insulator 42 and passes on to the isolated section 18 of the conductor, operation of the line switches 28 and 29 is prevented by reason of the control resistor 62 being effectively connected in series circuit relation therewith through contact members 60b being open. Operation of the resistor control switch 40 is prevented by reason of the manual control switch members 60a being open.

Accordingly, the vehicle draws little or no current, and the series switch control relay 16 remains in the deenergized position, so that the operating winding 14 of the switch device is energized to direct the vehicle, or the vehicle current collector, straight ahead along the main trolley conductor. Premature operation of the push button control switch 60 has no effect since the line switches are held in through contact members 28b until the current collector engages the section insulator 42.

From the above description and the accompanying drawing, it will be apparent that we have provided in a simple and effective manner for selectively controlling the operation of a switch at an intersection in a trolley system for selectively controlling either a track switch to guide the vehicle, or a trolley frog for guiding the vehicle current collector. Positive operation of the switch control relay, associated with the trolley conductor, is insured since the operation of the switch to the straight or to the turn depends only on which of the operating positions the manual control switch occupies. Inadvertent operation of the switch control relay by reason of the vehicle power circuit drawing current is effectively prevented by positively interrupting and preventing reclosure of the power circuit whenever it is desired that the control switch be not operated. Premature deenergization of the power system, due to premature operation of the manual control switch, as the vehicle approaches the intersection is also effectively prevented so that the vehicle without power for an absolute minimum of time does insure safe and adequate control of the vehicle under adverse traffic conditions.

Since certain changes may be made in the above described construction, and different embodiments of the invention may be made without departing from the spirit or scope thereof, it is intended that all the material contained in the above description or shown in the accompanying drawing shall be considered as illustrative and not in a limiting sense.

We claim as our invention:

1. Apparatus for use on a vehicle having control and power circuits energized from a trolley system conductor provided with a control section including a deenergized section preceding a serially connected control device for selectively controlling the operation of a switch device in the system comprising, control means operable to provide a path for a predetermined control current for operating the control device, and circuit means including a control switch selectively positionable to different positions to provide for operation of the control means or effect deenergization of the vehicle power circuit as the vehicle traverses the control section.

2. A control system for a switch in a trolley system having a conductor for supplying electric energy to the power and control circuits of a vehicle having a line switch for controlling the energization of said circuits, said conductor being provided with a serially related control relay for selectively controlling the switch and a deenergized section preceding the control relay for effectively deenergizing the vehicle power and control circuits comprising, control means on the vehicle to provide for drawing a predetermined control current for operating the control relay independently of the power or control circuits, and circuit means including a switch operable by the operator connected to control the energization of said control means and the line switch to provide for selectively operating or preventing operation of both the said control means and the line switch.

3. For use in a trolley system on a vehicle having power and control circuits disposed to be energized through a vehicle line switch from a trolley conductor having an insulated section followed by a serially connected control relay for selectively controlling the operation of a switch operable to different positions to provide for guiding the vehicle at least in part, a control circuit on the vehicle including means operable to provide a path for drawing a predetermined current through the serially connected relay in order to effect operation of the switch to one position, and means including a control switch operable in one position to provide an energizing circuit for effecting operation of said means and operable in another position to prevent operation of either said means or the vehicle line switch.

4. For use in a switch control system in conjunction with a control relay on an electrically operated vehicle for providing a predetermined path for a control current through a series relay connected between an isolated section of a trolley conductor and an energized section for selectively determining the operating position of an electric switch device guiding the vehicle at least in part, means for momentarily deenergizing the vehicle power circuit in advance of the switch, and circuit means on the vehicle including manually operable control means effective after the vehicle power circuit is deenergized to prevent operation of the control relay and prevent reenergization of the vehicle power circuit.

5. The combination with a control resistor on an electrically operated vehicle having a line switch for controlling a vehicle power circuit and control means operable to connect the control resistor in circuit to draw a predetermined current for operating a switch control relay connected in series circuit relation with a section of a trolley conductor, of means for momentarily deenergizing the vehicle power circuit at a predetermined point in advance of the switch, relay means responsive to deenergization of the power circuit to provide for momentarily energizing the control means, and manually operable switch means operable to prevent operation of either the control means or the line switch.

6. A control system for a current responsive relay associated with a trolley conductor in a trolley system for selectively controlling a switch device used to guide at least in part, an electrically operated vehicle having a power system energized from the conductor through a line switch comprising, means associated with the conductor for momentarily deenergizing the vehicle power system as the vehicle approaches the switch device, a control resistor on the vehicle, a control resistor switch operable to connect the control resistor in the power system for drawing a predetermined control current for operating the current responsive relay associated with the trolley conductor, normally energized relay means providing an energizing circuit for the line switch, a delayed drop out relay normally energized under the control of the relay means, circuit means controlled by the relay means and the delayed drop out relay for momentarily energizing the control resistor switch after the power system has been momentarily deenergized, and manual control means operable to prevent energization of the control resistor switch and the line switch subsequent to the momentary deenergization of the vehicle power circuit.

7. A control system for a switch control relay associated with a trolley conductor for supplying electrical energy to a vehicle having a power system including a line switch for controlling the energization of the power system from the conductor and a relatively low voltage source of control voltage comprising, a relatively high voltage relay normally energized from the trolley conductor, a relatively low voltage relay normally energized from the control source under the control of the high voltage relay and having a delayed drop out characteristic when deenergized, a section insulator connected in the trolley conductor in advance of the switch control relay for momentarily deenergizing the high voltage relay as the vehicle passes the insulator, means including a control resistor and a resistor control switch for providing a path for a predetermined control current for operating the switch control relay, circuit means controlled by the high and low voltage relays for energizing the resistor control switch only during the time interval between drop out of the high and low voltage relays, manual control means operable to interrupt the energizing circuits for the high voltage relay, the resistor control switch and the line switch, and circuit means including normally closed contacts of the high voltage relay for providing holding circuits for the high voltage relay and the line switch to prevent deenergization of the power circuit prior to passing the section insulator.

8. In a control system for a trolley system switch control relay serially connected with a trolley conductor supplying electrical energy to the vehicle power circuit through a line switch on the vehicle normally connected for energization by a control circuit controlled by a controller, a section insulator positioned in advance of the control relay for momentarily deenergizing the power circuit, control means operable to provide a path for a predetermined control current for operating the control relay, circuit means for preventing operation of the line switch subsequent to deenergization of the vehicle power circuit, manual control means normally providing operating circuits for energizing the control means and the line switch, said manual control means being operable to open the operating circuits for the control means and the line switch, and circuit means controlled by the line switch connected to provide an energizing circuit for the line switch and maintain said circuit until the power circuit is momentarily deenergized unless the vehicle power circuit controller is in the "off" position.

RAYMOND P. HANNA.
NORMAN J. ROSEN.

REFERENCES CITED

The following references are of record in the file of this patent:

UNITED STATES PATENTS

| Number | Name | Date |
|---|---|---|
| 2,298,185 | Whittaker | Oct. 6, 1942 |